United States Patent
Howard et al.

(10) Patent No.: US 9,632,618 B2
(45) Date of Patent: *Apr. 25, 2017

(54) EXPANDING TOUCH ZONES OF GRAPHICAL USER INTERFACE WIDGETS DISPLAYED ON A SCREEN OF A DEVICE WITHOUT PROGRAMMING CHANGES

(71) Applicant: International Business Machines Corporation, Armonk, NY (US)

(72) Inventors: Curtiss J. Howard, Cary, NC (US); Stephen J. Kenna, Cary, NC (US); Dana L. Price, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 92 days.

This patent is subject to a terminal disclaimer.

(21) Appl. No.: 14/605,505

(22) Filed: Jan. 26, 2015

(65) Prior Publication Data

US 2015/0277753 A1    Oct. 1, 2015

Related U.S. Application Data

(63) Continuation of application No. 14/242,482, filed on Apr. 1, 2014.

(51) Int. Cl.
*G06F 3/048* (2013.01)
*G06F 3/041* (2006.01)
(Continued)

(52) U.S. Cl.
CPC .......... *G06F 3/0416* (2013.01); *G06F 3/0418* (2013.01); *G06F 3/0482* (2013.01);
(Continued)

(58) Field of Classification Search
CPC ...... G06F 3/044; G06F 3/0416; G06F 3/0488; G06F 3/04883; G06F 3/04886; G06F 2203/04806
See application file for complete search history.

(56) References Cited

U.S. PATENT DOCUMENTS

2008/0172633 A1* 7/2008 Jeon .................... G06F 3/04886
715/810
2012/0293437 A1    11/2012 Zuo et al.
(Continued)

FOREIGN PATENT DOCUMENTS

EP    1847915 A2    10/2007
EP    2249239 A1    11/2010

OTHER PUBLICATIONS

List of IBM Patents or Patent Applications Treated as Related, 2015, pp. 1-2.

(Continued)

*Primary Examiner* — Jeffrey A Gaffin
*Assistant Examiner* — Justin Lee
(74) *Attorney, Agent, or Firm* — Robert A. Voigt, Jr.; Winstead, P.C.

(57) ABSTRACT

A method, system and computer program product for expanding the touch zones of graphical user interface (GUI) widgets. The coordinates of the screen location of the device (e.g., mobile device) where a GUI widget is displayed on the screen is captured in response to detecting the GUI widget being displayed on the screen. A list of objects, including GUI widgets, that are currently being displayed on the screen and corresponding screen location coordinates are obtained. A GUI widget is then identified from the list of objects by matching its screen location coordinates with the captured location coordinates. An algorithm to expand the touch zone (e.g., in a right-to-left alternation) of the GUI widget is then identified based on the type of widget (e.g., list) is the identified GUI widget. In this manner, the user is able to expand the touch zones of GUI widgets in an easy manner.

7 Claims, 8 Drawing Sheets

(51) Int. Cl.
*G06F 3/0482* (2013.01)
*G06F 3/0481* (2013.01)
*G06F 3/0484* (2013.01)
*G06F 3/0488* (2013.01)

(52) U.S. Cl.
CPC ........ *G06F 3/0488* (2013.01); *G06F 3/04817* (2013.01); *G06F 3/04842* (2013.01); *G06F 3/04886* (2013.01)

(56) References Cited

U.S. PATENT DOCUMENTS

| | | | |
|---|---|---|---|
| 2013/0002560 A1* | 1/2013 | Chen | G06F 3/0416 345/168 |
| 2013/0152001 A1 | 6/2013 | Lovitt et al. | |
| 2013/0198617 A1* | 8/2013 | Maloney | G06F 17/30056 715/252 |
| 2013/0339884 A1 | 12/2013 | Wilson et al. | |

OTHER PUBLICATIONS

Office Action for U.S. Appl. No. 14/242,482 dated Aug. 3, 2016, pp. 1-25.

* cited by examiner

EXPANDING TOUCH ZONES OF GRAPHICAL USER INTERFACE WIDGETS DISPLAYED ON A SCREEN OF A DEVICE WITHOUT PROGRAMMING CHANGES

TECHNICAL FIELD

The present invention relates generally to mobile computing devices, and more particularly to expanding the touch zones of graphical user interface widgets (e.g., lists, menus) displayed on a screen of a device, such as a mobile computing device, without programming changes.

BACKGROUND

A mobile computing device (also known as a handheld device, handheld computer or simply handheld) is a small, hand-held computing device, typically having a display screen with touch input and/or a miniature keyboard and weighting less than 2 pounds (0.91 kg). Examples of mobile devices include a mobile phone, a cellular phone, a smartphone, a person digital assistant (PDA) and the like.

One problem with these devices is that there is a very limited amount of screen space: the screen cannot physically be made bigger as the devices must be able to fit into the hand or pocket to be easily carried. As the screen is small, it may be difficult for the user to select an option in one of the graphical user interface widgets, such as lists and menus, due to the limited space or limited "touch zone." The touch zone refers to the amount of screen space provided to the user to select an option of the graphical user interface widget.

Unfortunately, the user interface implementation libraries do not provide the user options in changing the size of the touch zone of the graphical user interface widgets. Furthermore, most applications are written to display graphical user interface widgets with a default touch zone space. In order for the size of the touch zone space to be modified, the provider of the content (e.g., web page or application) being displayed on the mobile computing device would need to specifically modify the touch zone for their graphical user interface widgets displayed on the mobile computing device. In addition, with the variety of screen sizes available on mobile computing devices, the same graphical user interface widget may be easily selectable on one device but difficult to select on another device.

As a result, there is not currently a means for allowing the user to control the touch zone of the graphical user interface widgets, such as expanding the touch zone, so as to easily select the options displayed in the graphical user interface widgets.

BRIEF SUMMARY

In one embodiment of the present invention, a method for expanding touch zones of graphical user interface widgets comprises capturing coordinates of a location on a screen of a device where a graphical user interface widget is displayed on the screen. The method further comprises obtaining a list of objects displayed on the screen of the device and corresponding screen location coordinates where the objects are displayed on the screen of the device, wherein the list of objects comprises one or more graphical user interface objects. The method additionally comprises identifying one of the one or more graphical user interface widgets in the list of objects with a screen location coordinate matching the captured location coordinate. Furthermore, the method comprises identifying, by a processor, an algorithm to expand a touch zone for the identified graphical user interface widget. Additionally, the method comprises applying the algorithm to the identified graphical user interface widget to obtain new coordinates of the identified graphical user interface widget. In addition, the method comprises displaying the identified graphical user interface widget on the screen of the device with the new coordinates.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWINGS

A better understanding of the present invention can be obtained when the following detailed description is considered in conjunction with the following drawings, in which.

DETAILED DESCRIPTION

Figure 1:
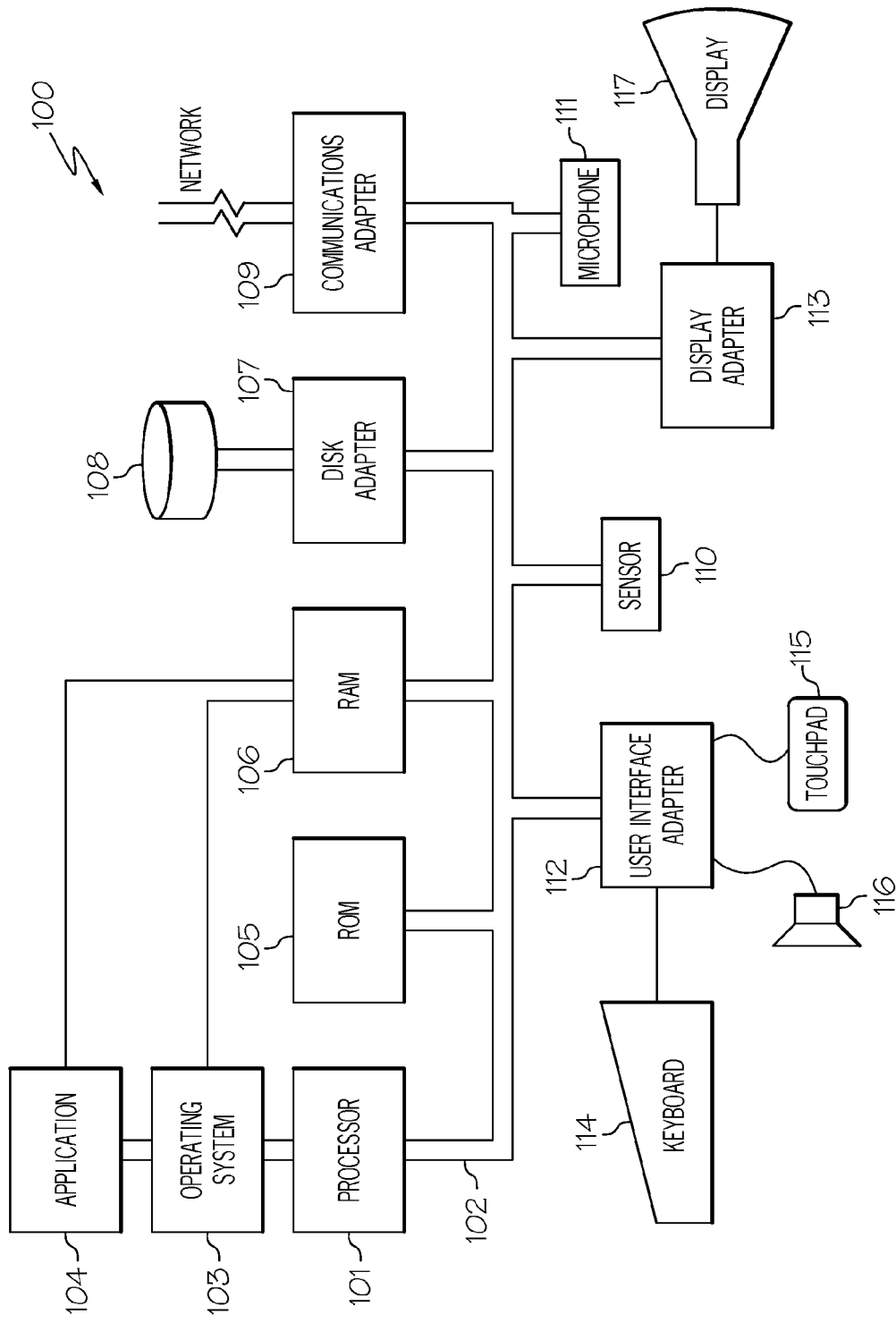
FIG. 1 illustrates a hardware configuration of a mobile device for practicing the principles of the present invention in accordance with an embodiment of the present invention.

The present invention comprises a method, system and computer program product for expanding touch zones of graphical user interface widgets. In one embodiment of the present invention, the coordinates of the location on the screen of a device (e.g., mobile device) where a graphical user interface widget is displayed is captured in response to detecting the graphical user interface widget being displayed on the screen. A list of objects, including graphical user interface widgets, that are currently being displayed on the screen and corresponding screen location coordinates where the objects are displayed on the screen are obtained. A graphical user interface widget is then identified from the list of objects by matching its screen location coordinates with the captured location coordinates (the coordinates of the graphical user interface widget being displayed on the screen). An algorithm (e.g., algorithm to expand the touch zone of lists in a right-to-left alternation) to expand the touch zone of the identified graphical user interface widget is then identified based on the type of widget (e.g., list) is the identified graphical user interface widget. The algorithm is then applied to the identified graphical user interface widget to obtain the new coordinates of the graphical user interface widget, where these new coordinates expand the touch zone of the graphical user interface widget. The identified graphical user interface widget is then displayed with the new coordinates on the screen of the device. In this manner, it is easier for the user of the device to select one of the options of the graphical user interface widget by having a larger touch zone to select the options without requiring any modifications to the application or web page.

While the following discusses the present invention in connection with expanding the touch zone of graphical user interface widgets on a screen of a mobile device, the principles of the present invention may be applied to any device (e.g., kiosk, watch) containing a screen displaying graphical user interface widgets, where the device receives input from a user, whether by physical contact (e.g., user touches the screen) or other means (e.g., voice, motion, gesture). A person of ordinary skill in the art would be capable of applying the principles of the present invention to such implementations. Further, embodiments applying the principles of the present invention to such implementations would fall within the scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Referring now to the Figures in detail, FIG. 1 illustrates a hardware configuration of a mobile device 100 for practicing the principles of the present invention in accordance with an embodiment of the present invention. Mobile device 100 may be any mobile computing device, including, but not limited to, a mobile phone, a cellular phone, a smartphone, a personal digital assistance (PDA), a gaming unit, a portable computing unit, a tablet personal computer and the like.

As illustrated in FIG. 1, mobile device 100 has a processor 101 coupled to various other components by system bus 102. An operating system 103 runs on processor 101 and provides control and coordinates the functions of the various components of FIG. 1. An application 104 in accordance with the principles of the present invention runs in conjunction with operating system 103 and provides calls to operating system 103 where the calls implement the various functions or services to be performed by application 104. Application 104 may include, for example, a native, hybrid or web application with graphical user interface widgets. In another example, application 104 may include a browser application for retrieving, presenting and traversing information resources on the World Wide Web. In a further example, application 104 may include what is referred to herein as the "event mechanism," such as an event handler configured to detect events, such as when a graphical user interface widget is displayed on the screen of mobile device 100 as well as when the user selects an object on the screen of mobile device 100, whether by physically touching the screen or via other means (e.g., voice, motion, gestures). In another example, application 104 may include what is referred to herein as the "touch zone mechanism," configured to expand the touch zones of graphical user interface widgets as discussed further below in association with FIGS. 3A-3B, 4-5 and 6A-6B. A description of the interaction between the touch zone mechanism and the event mechanism as well as with the native application/browser will be discussed below in association with FIG. 2.

Figure 2:
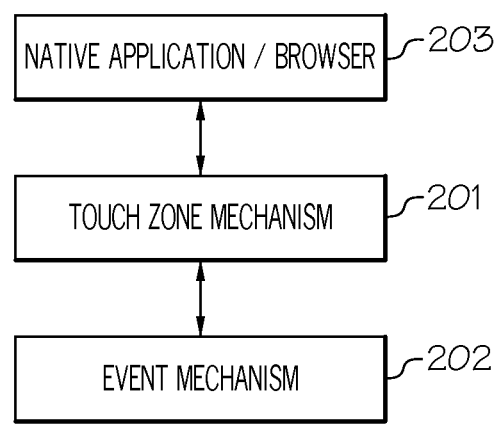
FIG. 2 illustrates the interaction between the touch zone mechanism and the event mechanism as well as with the native application/browser in accordance with an embodiment of the present invention.

FIG. 2 illustrates the interaction between the touch zone mechanism and the event mechanism as well as with the native application/browser in accordance with an embodiment of the present invention.

Referring to FIG. 2, as discussed above, touch zone mechanism 201 is configured to expand the touch zones of graphical user interface widgets. In one embodiment, touch zone mechanism 201 resides in operating system 103. In another embodiment, touch zone mechanism 201 resides in a library (e.g., JavaScript® library). In a further embodiment, touch zone mechanism 201 resides in a development environment. Touch zone mechanism 201 can expand the touch zones of graphical user interface widgets without requiring any change to the application or web page due to its interaction between event mechanism 202 and the native application or browser 203. As discussed above, event mechanism 202 (e.g., event handler) is configured to detect events, such as when a graphical user interface widget is displayed on the screen (e.g., display 117) of mobile device 100 as well as when the user selects an object displayed on the screen (e.g., display 117) of mobile device 100, such as by physically touching the screen or via other means (e.g., voice, motion, gestures). Upon detecting such an event, event mechanism 202 triggers an event as well as obtains the coordinates of the location on the screen where the graphical user interface object is displayed or where the user selected an object. These coordinates are captured by touch zone mechanism 201. Furthermore, touch zone mechanism 201 obtains a list of the objects, including the graphical user interface widgets, that are currently being displayed on the screen of mobile device 100 from the native application/browser 203. As will be discussed in further detail below, as a result of the interactions with event mechanism 202 and native application/browser 203, touch zone mechanism 201 is configured to expand the touch zone for the graphical user interface widgets (e.g., lists, menus) without having to change the application or web page.

Returning to FIG. 1, mobile device 100 further includes a read-only memory ("ROM") 105 coupled to system bus 102. In one embodiment, ROM 105 stores the basic input/output system ("BIOS") that controls certain basic functions of mobile device 100. Mobile device 100 additionally includes random access memory ("RAM") 106 and disk adapter 107 that are also coupled to system bus 102. It should be noted that software components including operating system 103 and application 104 may be loaded into RAM 106, which may be mobile device's 100 main memory for execution. Disk adapter 107 may be an integrated drive electronics ("IDE") adapter that communicates with a disk unit 108, e.g., disk drive.

Mobile device 100 may further include a communications adapter 109 coupled to bus 102. Communications adapter 109 interconnects bus 102 with an outside network thereby enabling mobile device 100 to communicate with other devices (e.g., computer networking devices, mobile devices).

Furthermore, mobile device 100 may include a sensor 110 configured to capture gestures or motions provided by the user to make a selection of an object (e.g., graphical user interface widget) displayed on the screen (e.g., display 117) of mobile device 100. Additionally, mobile device 100 may include a microphone 111 configured to convert sound, such as the words spoken by the user of mobile device 100, into an electrical signal which may then be used by a speech recognition system, such as speech recognition software which may be stored in application 104, to interpret the words spoken by the user of mobile device 100. In this manner, the user of mobile device 100 may make a selection of an object (e.g., graphical user interface widget) displayed on the screen (e.g., display 117) of mobile device 100.

I/O devices may also be connected to mobile device 100 via a user interface adapter 112 and a display adapter 113. Keyboard 114, touchpad 115 and speaker 116 may all be interconnected to bus 102 through user interface adapter 112. A display monitor 117 may be connected to system bus 102 by display adapter 113. In this manner, a user is capable of inputting to mobile device 100 through keyboard 114 or touchpad 115 and receiving output from mobile device 100 via display 117 or speaker 116. Other input mechanisms may be used to input data to mobile device 100 that are not shown in FIG. 1, such as display 117 having touch-screen capability and keyboard 114 being a virtual keyboard. Mobile device 100 of FIG. 1 is not to be limited in scope to the elements depicted in FIG. 1 and may include fewer or additional elements than depicted in FIG. 1.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, a problem with mobile devices is that there is a very limited amount of screen space: the screen cannot physically be made bigger as the devices must be able to fit into the hand or pocket to be easily carried. As the screen is small, it may be difficult for the user to select an option in one of the graphical user interface widgets, such as lists and menus, due to the limited space or limited "touch zone." The touch zone refers to the amount of screen space provided to the user to select an option of the graphical user interface widget. Unfortunately, the user interface implementation libraries do not provide the user options in changing the size of the touch zone of the graphical user interface widgets. Furthermore, most applications are written to display graphical user interface widgets with a default touch zone space. In order for the size of the touch zone space to be modified, the provider of the content (e.g., web page) being displayed on the mobile computing device would need to specifically modify the touch zone for their graphical user interface widgets displayed on the mobile computing device. In addition, with the variety of screen sizes available on mobile computing devices, the same graphical user interface widget may be easily selectable on one device but difficult to select on another device. As a result, there is not currently a means for allowing the user to control the touch zone of the graphical user interface widgets, such as expanding the touch zone, so as to easily select the options displayed in the graphical user interface widgets.

Figure 3A:
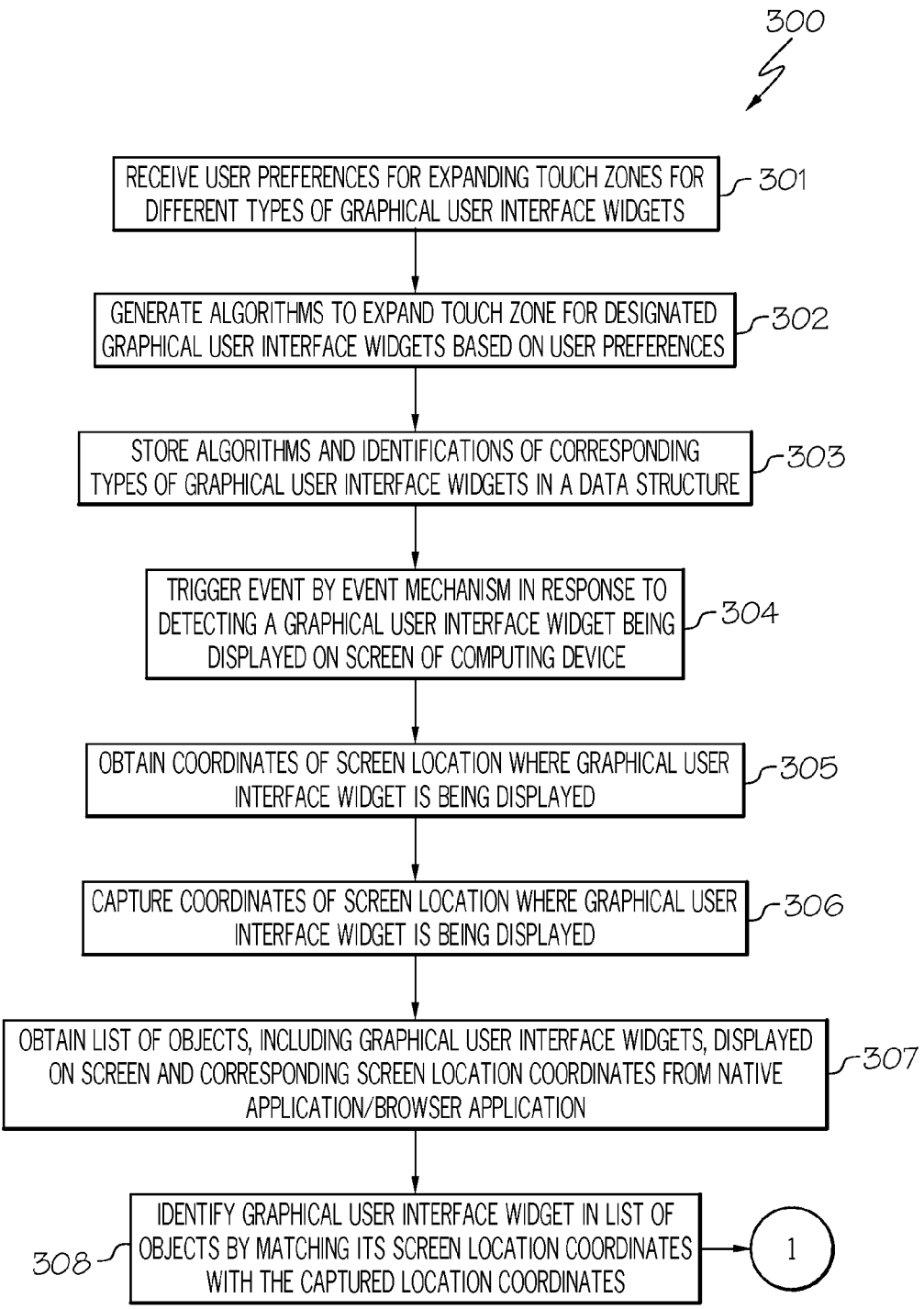
FIGS. 3A-3B are a flowchart of a method for expanding the touch zones of graphical user interface widgets in accordance with an embodiment of the present invention.
Figure 3B:
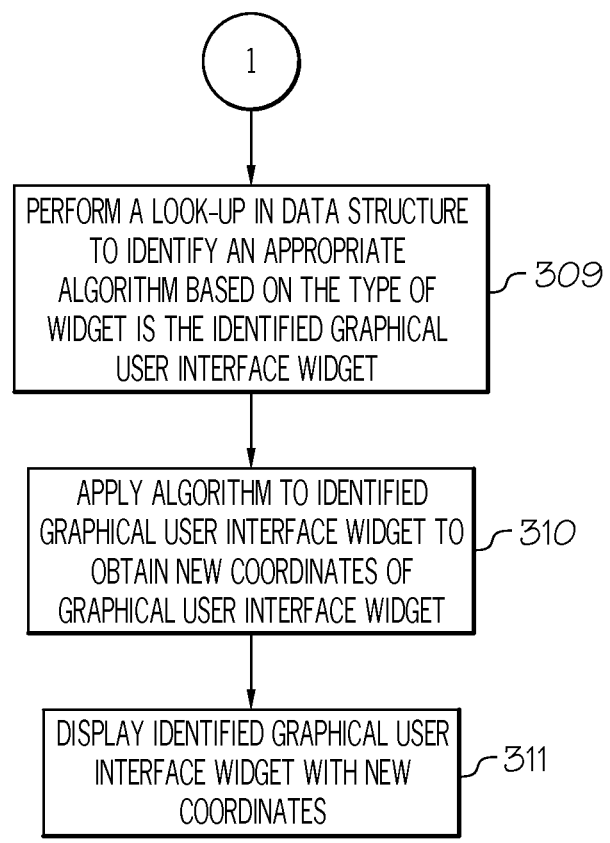
Figure 4:
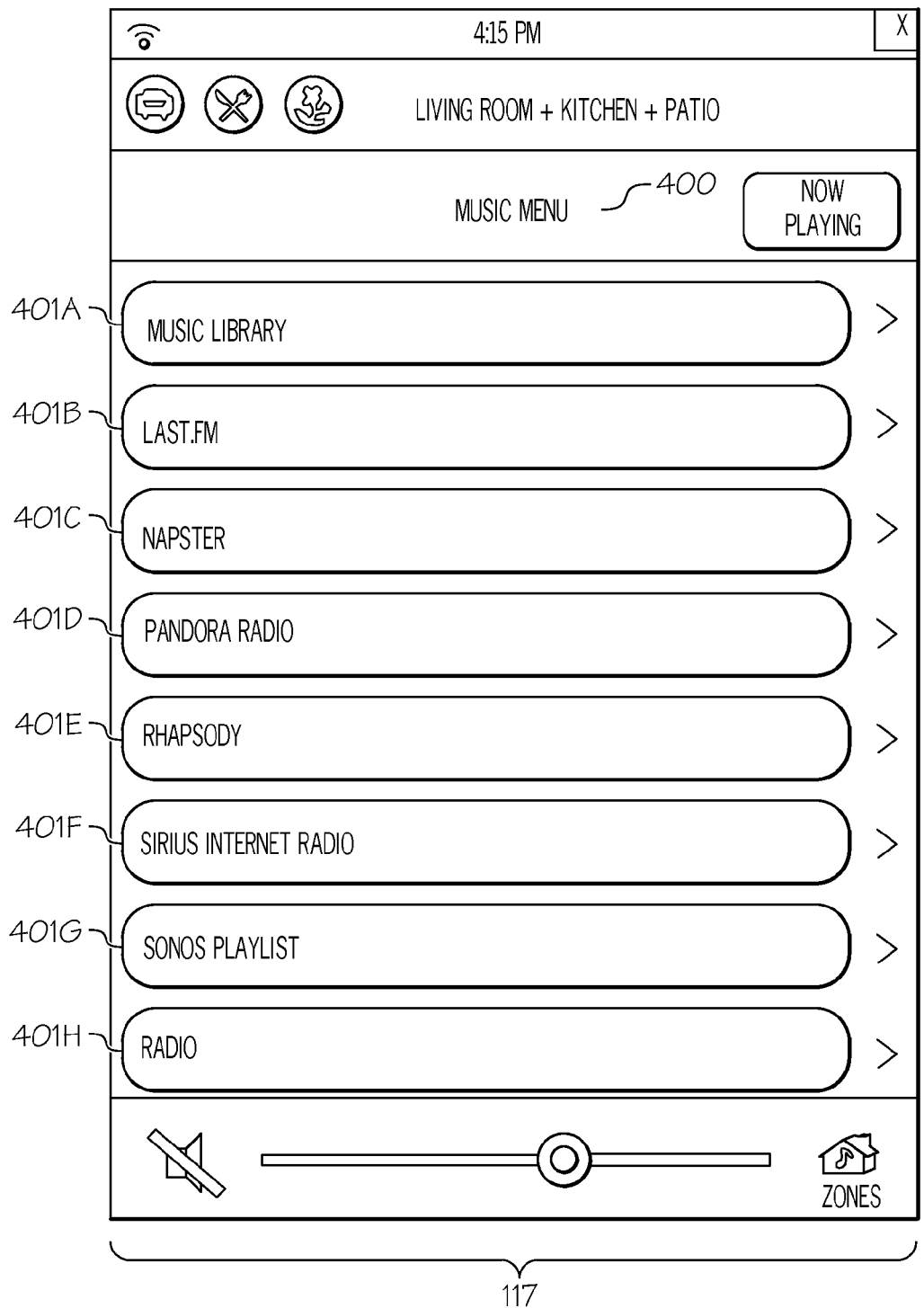
FIG. 4 illustrates a menu graphical user interface widget prior to expanding its touch zone in accordance with an embodiment of the present invention.
Figure 5:
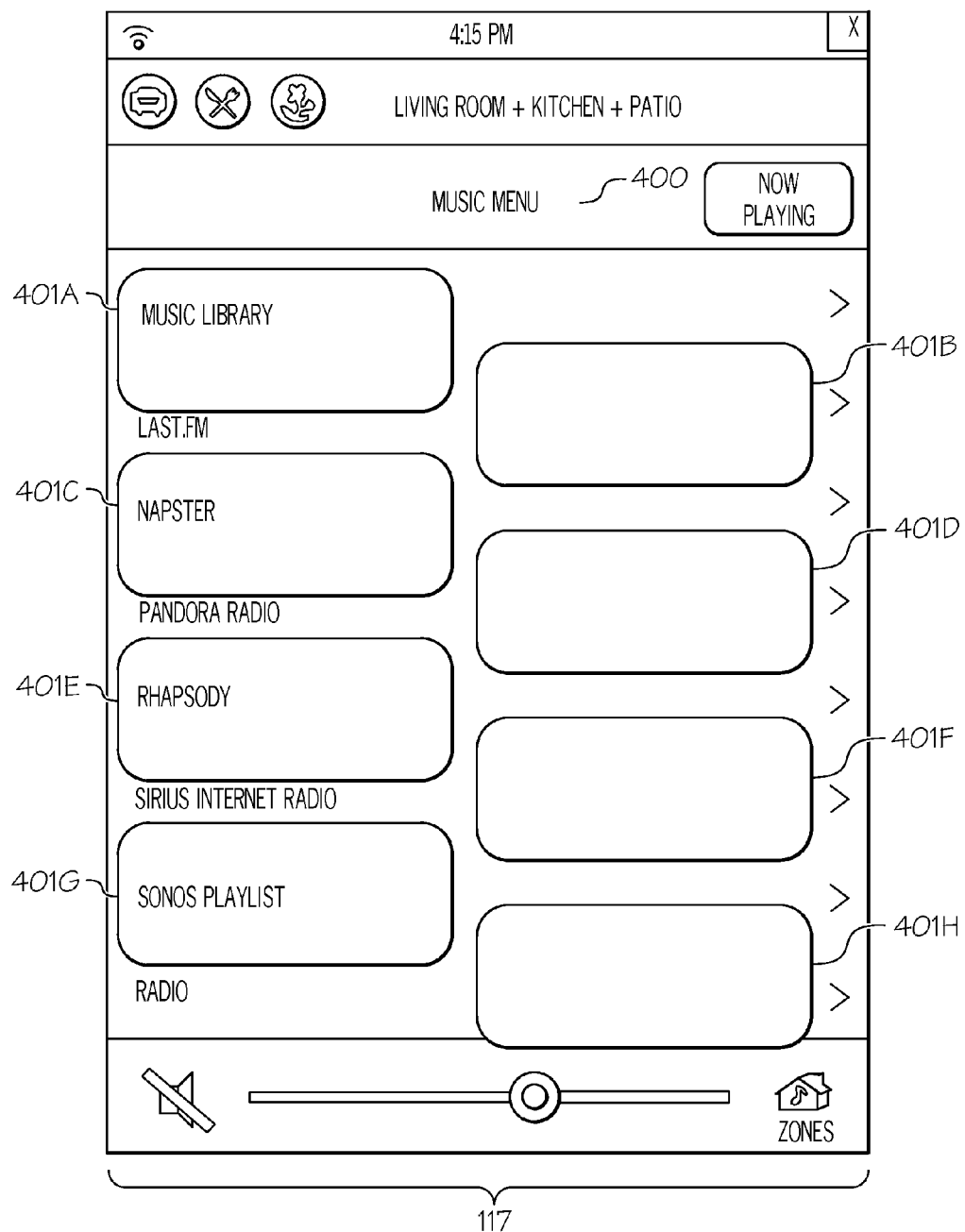
FIG. 5 illustrates the menu graphical user interface widget after expanding its touch zone in accordance with an embodiment of the present invention.
Figure 6A:
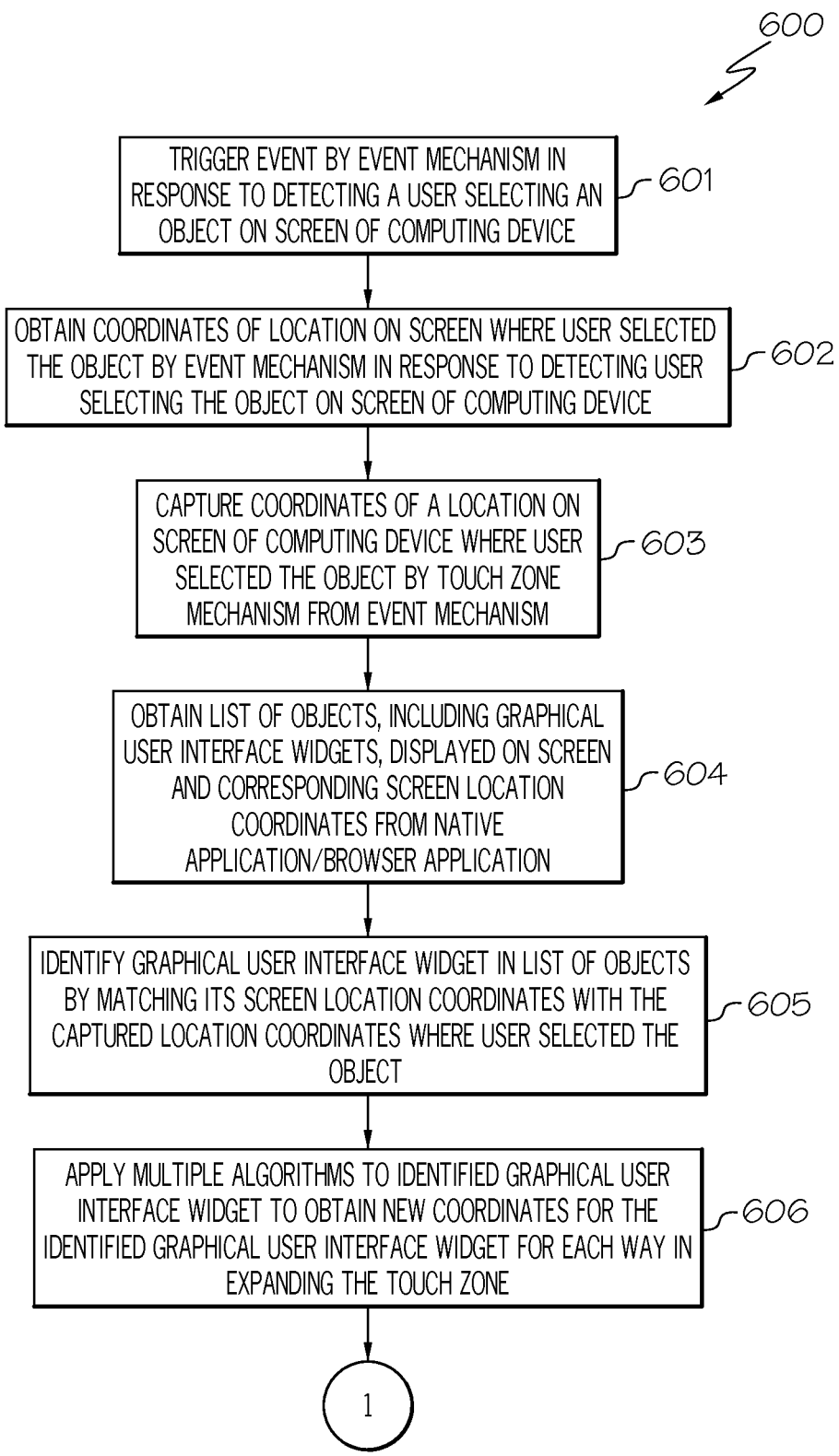
FIGS. 6A-6B are a flowchart of an alternative method for expanding the touch zones of graphical user interface widgets in accordance with an embodiment of the present invention.
Figure 6B:
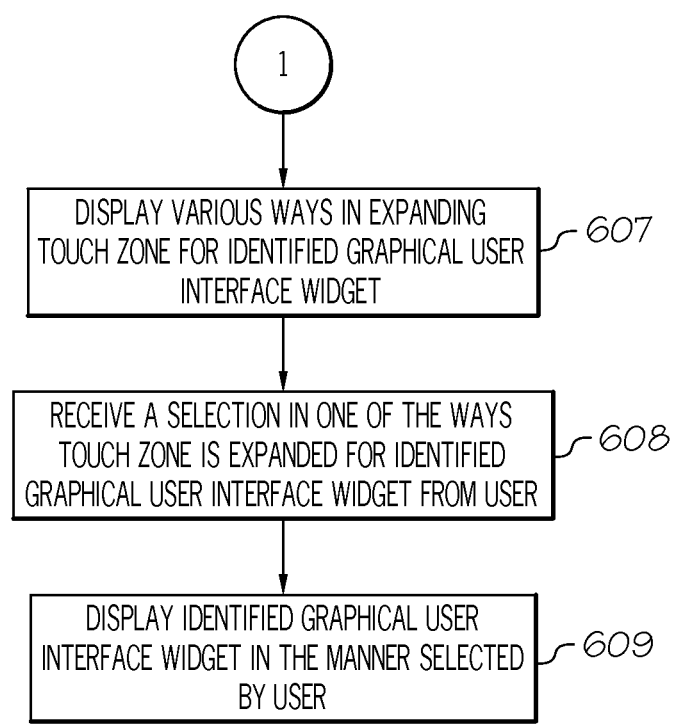

The principles of the present invention provide a means for allowing the user to control the touch zone of the graphical user interface widgets, such as expanding the touch zone, so as to easily select the options displayed in the graphical user interface widgets as discussed further below in connection with FIGS. 3A-3B, 4-5 and 6A-6B. FIGS. 3A-3B are a flowchart of a method for expanding the touch zones of graphical user interface widgets. FIG. 4 illustrates a menu graphical user interface widget prior to expanding its touch zone. FIG. 5 illustrates the menu graphical user interface widget after expanding its touch zone. FIGS. 6A-6B are a flowchart of an alternative method for expanding the touch zones of graphical user interface widgets.

As stated above, FIGS. 3A-3B are a flowchart of a method 300 for expanding the touch zones of graphical user interface widgets in accordance with an embodiment of the present invention.

Referring to FIG. 3A, in conjunction with FIGS. 1-2, in step 301, touch zone mechanism 201 receives user preferences for expanding touch zones for different types of graphical user widgets, such as lists and menus. For example, the user may prefer to expand the touch zone for a list by expanding the touch zone in a right-to-left alternation. In another example, the user may prefer to expand the touch zone for a menu by expanding the touch zone in a staggered manner. Other options for expanding the touch zone, include, but not limited to, expanding the touch zone in a left-to-right alternation as well as by a side-by-side alternation. A further description and illustration of expanding the touch zone of a graphical user interface widget will be discussed further below.

In step 302, touch zone mechanism 201 generates algorithms to expand touch zones for designated graphical user interface widgets based on user preferences. For example, an algorithm may be generated that staggers the touch zone for all lists to be left and right. In another example, an algorithm may be generated that staggers the touch zones for menus to be top and bottom.

In step 303, touch zone mechanism 201 stores the algorithms and the identifications of the corresponding types of graphical user interface widgets (e.g., lists, menus) whose touch zones will be expanded by the algorithms in a data structure. For example, the algorithm for expanding the touch zones for lists in a right-to-left alternation is stored in a data structure along with an identification for the lists (type of graphical user interface widget). In one embodiment, such a data structure may reside in memory (e.g., ROM 105) or in a storage medium (e.g., disk unit 108).

In step 304, event mechanism 202 triggers an event in response to detecting a graphical user interface widget being displayed on screen 117 of mobile device 100.

In step 305, event mechanism 202 obtains the coordinates of the location on screen 117 where the graphical user interface widget is being displayed on screen 117 of mobile device 100.

In step 306, touch zone mechanism 201 captures the coordinates of the location on screen 117 where the graphical user interface widget is being displayed.

In step 307, touch zone mechanism 201 obtains a list of objects, including graphical user interface widgets, that are currently being displayed on screen 117 and corresponding screen location coordinates where these objects are displayed on screen 117 from native application/browser 203.

In step 308, touch zone mechanism 201 identifies a graphical user interface widget in the list of objects by matching its screen location coordinates (obtained in step 307) with the captured location coordinates (the coordinates of the graphical user interface widget being displayed on screen 117 which is obtained in step 306).

Referring to FIG. 3B, in conjunction with FIGS. 1-2, in step 309, touch zone mechanism 201 performs a look-up in the data structure to identify the appropriate algorithm to expand the touch zone of the graphical user interface widget based on the type of widget (e.g., menu) being displayed. For example, as discussed above, touch zone mechanism 201 identifies the graphical user interface widget, including its type (e.g., list, menu), in step 308. Touch zone mechanism 201 may then identify the appropriate algorithm to implement for such a type of graphical user interface widget (e.g., menu) from the data structure.

In step 310, touch zone mechanism 201 applies the algorithm to the identified graphical user interface widget (e.g., menu) to obtain the new coordinates of the graphical user interface widget, where these new coordinates expand the touch zone of the graphical user interface widget as illustrated in FIGS. 4 and 5.

FIG. 4 illustrates a menu graphical user interface widget 400 on screen 117 of mobile device 100 prior to expanding its touch zone in accordance with an embodiment of the present invention. As illustrated in FIG. 4, menu graphical user interface widget 400 includes various selectable options 401A-401H for the user to select which may be difficult for the user due to the limited space or limited touch zone.

As a result, touch zone mechanism 201 applies an algorithm to expand the touch zone of the menu graphical user interface widget 400 using the user's preference for expanding the touch zone for such a type of graphical user interface widget thereby making it easier for the user to select an option of menu graphical user interface widget 400 as illustrated in FIG. 5.

FIG. 5 illustrates menu graphical user interface widget 400 on screen 117 of mobile device 100 after expanding its touch zone in accordance with an embodiment of the present invention. As illustrated in FIG. 5, the touch zone of menu graphical user interface widget 400 was expanded in a side-by-side alternate manner. As a result, it is easier for the user of mobile device 100 to select one of the options 401A-401H of menu graphical user interface widget 400 by having a larger touch zone to select the options. Furthermore, by using the principles of the present invention where touch zone mechanism 201 interacts with event mechanism 202 and native application/browser 203 as discussed above, touch zone mechanism 201 is configured to expand the touch zone for the graphical user interface widgets (e.g., lists, menus) without having to change the application or web page.

Returning to FIG. 3B, in conjunction with FIGS. 1-2 and 4-5, in step 311, touch zone mechanism 201 displays the identified graphical user interface widget (e.g., menu) with the new coordinates on screen 117, such as illustrated in FIG. 5. While the foregoing description discusses displaying the identified graphical user interface widget with new coordinates, an alternative embodiment for displaying the identified graphical user interface widget is to apply an overlay on top of the existing, non-changed identified graphical user interface representation of the widget, where the overlay is used to depict the expanded touch zone.

Another embodiment for expanding the touch zones of graphical user interface widgets is discussed below in connection with FIGS. 6A-6B.

FIGS. 6A-6B are a flowchart of an alternative method for expanding the touch zones of graphical user interface widgets in accordance with an embodiment of the present invention.

Referring to FIG. 6A, in conjunction with FIGS. 1-2, in step 601, event mechanism 202 triggers an event in response to detecting a user selecting an object on screen 117 of mobile device 100. A selection of an objection on screen 117 of mobile device 100 may be accomplished in many manners, such as by physically touching the screen or by motion, gestures or voice.

In step 602, event mechanism 202 obtains the coordinates of the location on screen 117 where the user selected the object in response to detecting the user selecting the object on screen 117 of mobile device 100.

In step 603, touch zone mechanism 201 captures the coordinates of the location on screen 117 where the user selected the object from event mechanism 202.

In step 604, touch zone mechanism 201 obtains a list of objects, including graphical user interface widgets, that are currently being displayed on screen 117 and corresponding screen location coordinates where these objects are displayed on screen 117 from native application/browser 203.

In step 605, touch zone mechanism 201 identifies a graphical user interface widget in the list of objects selected by the user based on matching its screen location coordinates (obtained in step 604) with the captured location coordinates (the coordinates of the object selected by the user on screen 117 which is obtained in step 603).

In step 606, touch zone mechanism 201 applies multiple algorithms (e.g., algorithm to expand touch zone of lists in a staggered manner from left to fight, algorithm to expand touch zone of lists in a right-to-left alternation, algorithm to expand touch zone of lists in a left-to-right alternation) to the identified graphical user interface (e.g., list) to obtain the new coordinates of the identified graphical user interface widget for each way in expanding the touch zone to illustrate the various ways in expanding the touch zone for the identified graphical user interface widget. For example, suppose that the identified graphical user interface widget corresponds to a list. Touch zone mechanism 201 may apply various algorithms to expand the touch zone of the list, such as an algorithm to expand the touch zone in a right-to-left alternation, in a left-to-right alternation and in a staggered manner from left to-right.

Referring now to FIG. 6B, in conjunction with FIGS. 1-2, in step 607, touch zone mechanism 201 displays on screen 117 of mobile device 100 the various ways in expanding the touch zone for the identified graphical user interface widget. Referring to the example discussed above, touch zone mechanism 201 may display on screen 117 an expanded touch zone for the list in a right-to-left alternation and then display an expanded touch zone for the list in a left-to-right alternation and then display an expanded touch zone for the list in a staggered manner from left-to-right. In one embodiment, touch zone mechanism 201 may display on screen 117 each option in expanding the touch zone of the identified graphical user interface widget in succession to one another, such as displaying each option after a period of time has expired.

In step 608, touch zone mechanism 201 receives a selection from the user (user of mobile device 100) of one of the optional ways in expanding the touch zone for the identified graphical user interface widget. In one embodiment, the user (user of mobile device 100) may be presented with a list of options, such as in a drop down list, on screen 117 for the various ways in expanding the touch zone for the identified graphical user interface widget. The user may then select one of these options from the drop down list. For example, the drop down list may include the options of expanding the touch zone for the graphical user interface widget in a left-to-right alternation, in a right-to-left alternation and in a staggered manner from left-to-right. As each of these options is displayed to the user on screen 117 (as discussed above in step 607), an indicator may be presented to the user on screen 117 informing the user of which particular option is currently being shown to the user. In this manner, the user will be making an informed decision as to which optional way to expand the touch zone for the identified graphical user interface widget. In one embodiment, such a selection may be saved as the user's preference in the way to expand the touch zone for such a type of graphical user interface widget. Touch zone mechanism 201 may then automatically expand the touch zone in such a manner when the same type of graphical user interface widget is displayed to the user.

In step 609, touch zone mechanism 201 displays the identified graphical user interface widget on screen 117 in the manner selected by the user. For example, if the user selected the option to display the identified graphical user interface widget in a left-to-right alternation, then touch zone mechanism 201 will expand the touch zone of the identified graphical user interface widget in a left-to-right alternation. As a result, it is easier for the user of mobile device 100 to select one of the options of the graphical user interface widget by having a larger touch zone to select the options. Furthermore, as discussed above, by using the principles of the present invention where touch zone mechanism 201 interacts with event mechanism 202 and native application/browser 203, touch zone mechanism 201 is configured to expand the touch zone for the graphical user interface widgets (e.g., lists, menus) without having to change the application or web page.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for expanding touch zones of graphical user interface widgets, the method comprising:

capturing coordinates of a location on a screen of a device where a graphical user interface widget is displayed on said screen;

obtaining a list of objects displayed on said screen of said device and corresponding screen location coordinates where said objects are displayed on said screen of said device, wherein said list of objects comprises one or more graphical user interface objects;

identifying one of said one or more graphical user interface widgets in said list of objects with a screen location coordinate matching said captured location coordinate;

identifying, by a processor, an algorithm out of a plurality of algorithms for expanding touch zones for different types of graphical user widgets to expand a touch zone for said identified graphical user interface widget;

applying said algorithm to said identified graphical user interface widget to obtain new coordinates of said identified graphical user interface widget; and displaying said identified graphical user interface widget on said screen of said device with said new coordinates.

2. The method as recited in claim 1 further comprising:

receiving user preferences for expanding a touch zone for different types of graphical user interface widgets;

generating algorithms to expand touch zones for designated graphical user interface widgets based on said received user preferences; and storing said generated algorithms and identifications of corresponding types of graphical user interface widgets whose touch zones will be expanded by said generated algorithms in a data structure.

3. The method as recited in claim 2 further comprising:

performing a look-up in said data structure to identify said algorithm to expand said touch zone for said identified graphical user interface widget based on a type of widget is said identified graphical user interface widget.

4. The method as recited in claim 1, wherein said identified graphical user interface widget comprises one of the following: a list and a menu.

5. The method as recited in claim 1, wherein said algorithm expands said touch zone for said identified graphical user interface widget by one of the following manners: right-to-left alternation, left-to-right alternation, staggered and side-by-side alternation.

6. The method as recited in claim 1, wherein said list of objects displayed on said screen of said device and corresponding screen location coordinates are obtained from a native application or browser application.

7. The method as recited in claim 1, wherein said coordinates of said location on said screen of said device where said graphical user interface widget is displayed on said screen are captured from an event mechanism in response to said event mechanism detecting said graphical user interface widget being displayed on said screen.

* * * * *